United States Patent
Skowerski et al.

(10) Patent No.: US 11,939,410 B2
(45) Date of Patent: Mar. 26, 2024

(54) ORGANORUTHENIUM COMPLEXES AS PRECATALYSTS FOR OLEFIN METATHESIS

(71) Applicant: Apeiron Synthesis S.A., Wroclaw (PL)

(72) Inventors: Krzysztof Skowerski, Jablonowo Pomorskie (PL); Michal Chwalba, Wroclaw (PL); Anna Gawin, Warsaw (PL); Rafal Gawin, Warsaw (PL); Patryk Krajczy, Glogowek (PL)

(73) Assignee: APEIRON SYNTHESIS S.A., Wroclaw (PL)

( * ) Notice: Subject to any disclaimer, the term of this patent is extended or adjusted under 35 U.S.C. 154(b) by 648 days.

(21) Appl. No.: 17/255,685

(22) PCT Filed: Jun. 11, 2019

(86) PCT No.: PCT/IB2019/054879
§ 371 (c)(1),
(2) Date: Dec. 23, 2020

(87) PCT Pub. No.: WO2020/003035
PCT Pub. Date: Jan. 2, 2020

(65) Prior Publication Data
US 2021/0269565 A1    Sep. 2, 2021

Related U.S. Application Data

(60) Provisional application No. 62/691,853, filed on Jun. 29, 2018.

(51) Int. Cl.
| | | |
|---|---|---|
| *C08F 132/08* | (2006.01) | |
| *C07F 15/00* | (2006.01) | |
| *C08F 2/36* | (2006.01) | |
| *C08F 4/60* | (2006.01) | |
| *C08F 4/70* | (2006.01) | |

(52) U.S. Cl.
CPC ........ *C08F 132/08* (2013.01); *C07F 15/0046* (2013.01); *C08F 2/36* (2013.01); *C08F 4/6001* (2013.01); *C08F 4/7026* (2013.01); *C08F 2410/01* (2013.01)

(58) Field of Classification Search
CPC ........ C08F 4/7026; C08F 2/36; C08F 132/08; C07F 15/0046; C08G 61/08
USPC ............................................ 556/137; 585/647
See application file for complete search history.

(56) References Cited

FOREIGN PATENT DOCUMENTS

WO    2014016422 A1    1/2014

OTHER PUBLICATIONS

Adrien Dumas et al.; "Synthesis and Application of Stereoretentive Ruthernium Catalysts on the Basis of the M7 and the Ru-Benzylidene-Oxazinose Design"; Organometallics; Mar. 1, 2018.
Grela et al.; "A Highly Efficient Ruthenium Catalyst for Metathesis Reactions"; Angew. Chem. Int. Ed.; 2002.
CatMonsaert, et al.; "Latent olefin metathesis catalysts"; Chemical Society Reviews; 2009.
Pietraszuk, et al.; Ruthenium-Amido Complexes: Synthesis, Structure, and Catalytic Activity in Olefin Metathesis; Chemistry A European Journal; 2012.
Vougioukalakis, et al.; Ruthenium-Based Heterocyclic Carbene-Coordinated Olefin Metathesis Catalysts; Institute of Physical Chemistry; 2009; Greece.
Perring, et al.; "Assembly of Organic Monolayers on Polydicyclopentadiene"; University of Iowa; 2008; United States.
Drozdzak, et al.; Latent Olefin Metathesis Catalysts for Polymerization of Dcpd; Macromol. Symp.; 2010; Germany.

*Primary Examiner* — Fred M Teskin
(74) *Attorney, Agent, or Firm* — Dickinson Wright PLLC; Andrew D. Dorisio

(57) ABSTRACT

Embodiments in accordance with the present invention encompass an organoruthenium compound of the formula I: (I) wherein X, Y, $L_1$, $L_2$, $R_1$, $R_2$, $R_3$, $R_4$ and $R_5$ are as defined herein. Also disclosed herein are the use of organoruthenium compound of the formula I as (pre)catalysts for the olefin metathesis reactions, as well as to the process for carrying out the olefin metathesis reaction.

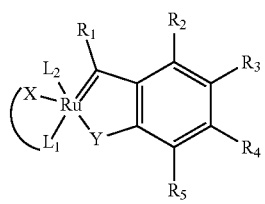

20 Claims, No Drawings

ORGANORUTHENIUM COMPLEXES AS PRECATALYSTS FOR OLEFIN METATHESIS

BACKGROUND OF THE INVENTION

Field of the Invention

The present invention relates to a series of metal complexes, their use as (pre)catalysts in the metathesis reaction as well as the process for carrying out the metathesis reaction. More specifically, the present invention relates to a series of organoruthenium compounds which when activated under suitable conditions exhibit improved catalytic activity for a wide range of metathesis reactions. This invention also relates to methods of making these compounds. Accordingly, the compounds of this invention find utility as precatalysts for carrying out a variety of olefin metathesis reactions, including ring-opening metathetic polymerization (ROMP), among others.

Description of the Art

The metathesis of olefins is an important tool in the organic synthesis (Handbook of Metathesis, Vol. I-III, Grubbs, R. H., ed.; Wiley-VCH, 2003).

Many ruthenium complexes actively catalyzing the metathesis of olefins are well known in the art (see, for example, Vougioukalakis, G. C.; Grubbs, R. H. Chem. Rev. 2010, 110, 1746). The third generation complexes (such as Gru-III, Ind-III) were shown to be highly useful (pre) catalysts of the ring-opening metathetic polymerization (ROMP) reaction.

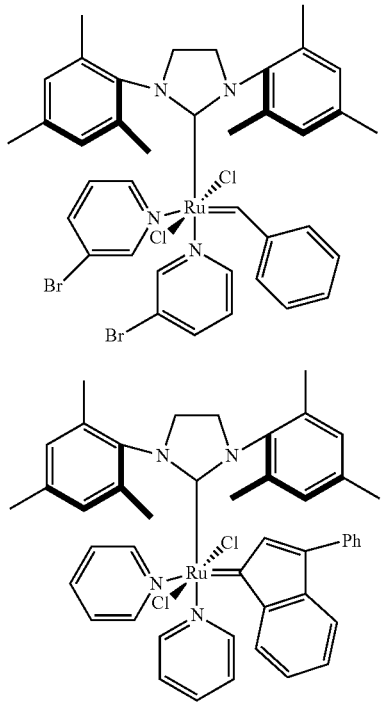

The third-generation catalysts initiate the metathesis reactions very promptly, whereas, in some metathesis applications, such as mold ROMP polymerization, it is advantageous to use a (pre)catalyst that does not initiate the reaction immediately after adding it to the substrate but only after an appropriate initiation by chemical agents, temperature or light. The complexes characterized by delayed initiation are often termed "dormant catalysts" (Monsaert, S.; Vila, A. L.; Drozdzak, R.; Van Der Voort, P.; Verpoort, F., Chem. Soc. Rev., 2009, 38, 3360; R. Drozdzak, N. Nishioka, G. Recher, F. Verpoort, Macromol. Symp. 2010, 293, 1-4). Exemplary "dormant catalysts" are the complexes A-F, as well as the recently obtained P-1 and P-2 (Pietraszuk, C.; Rogalski, S.; Powala, B.; Mitkiewski, M.; Kubicki, M.; Spolnik, G.; Danikiewicz, W.; Wozniak, K.; Pazio, A.; Szadkowska, A.; Kozlowska, A.; Grela, K., Chem. Eur. J, 2012, 18, 6465-6469).

The mold ROMP polymerization allows obtaining finished articles. Dicyclopentadiene is one of the monomers frequently used for the mold polymerization. Polydicyclopentadiene, being obtained by polymerization of dicyclopentadiene, features, inter alia, a low moisture absorption as well as resistance to stress and high temperature. This is why parts of vehicles and specialized containers for the chemical industry are more and more frequently manufactured by the (mold) ROMP polymerization of dicyclopentadiene.

U.S. Pat. No. 9,328,132 B2 addresses some of these deficiencies faced by the art in providing more robust "dormant catalysts" for olefin metathesis reactions, pertinent portions of which are incorporated herein by reference. However, there is still a need for improved "dormant catalysts" which can be activated under desirable ROMP polymerization conditions and based on the intended end applications.

Accordingly, it is an object of this invention to provide a series of improved "dormant catalysts."

It is also an object of this invention to provide processes for the preparation of such organoruthenium dormant catalysts as disclosed herein.

Other objects and further scope of the applicability of the present invention will become apparent from the detailed description that follows.

From the viewpoint of practical industrial applications, it is of extreme importance that the (pre)catalysts are stable in the presence of oxygen as well as moisture, during both their synthesis and purification, and also during their use in the metathesis reaction. Development of stable and active (pre) catalysts for metathesis of olefins as reported in the literature allowed to broaden significantly the scope of possible uses of this transformation. Nevertheless, these complexes are still prepared and used in metathesis reactions in atmosphere of inert gas, in dry solvents, since their stability against oxygen and moisture is limited.

Surprisingly, it has now been found that the ruthenium complexes depicted by the formula I are stable in the presence of air and moisture.

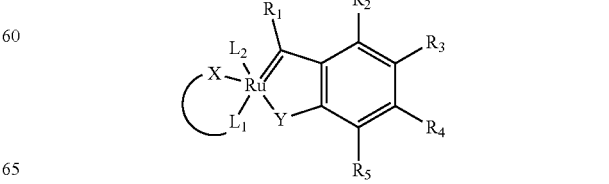

(I)

wherein:

is a monovalent anionic bidentate ligand;

Y is oxygen or sulfur;

$L_2$ is a neutral ligand;

$R_1$ is selected from the group consisting of hydrogen, $(C_1$-$C_{20})$alkyl, $(C_2$-$C_{20})$alkenyl, $(C_2$-$C_{20})$alkynyl and $(C_6$-$C_{10})$aryl;

$R_2$, $R_3$, $R_4$ and $R_5$ are the same or different and each independently selected from the group consisting of hydrogen, halogen, $(C_1$-$C_{16})$alkyl, $(C_1$-$C_{16})$alkoxy, $(C_1$-$C_{16})$perfluoroalkyl, $(C_3$-$C_7)$cycloalkyl, $(C_2$-$C_{16})$alkenyl, $(C_6$-$C_{14})$aryl, $(C_6$-$C_{14})$perfluoroaryl, $(C_3$-$C_{12})$heterocyclyl, —$OR_6$, —$NO_2$, —COOH, —$COOR_6$, —$CONR_6R_7$, —$SO_2NR_6R_7$, —$SO_2R_6$, —CHO, —$COR_6$, wherein $R_6$ and $R_7$ are the same or different and each independently selected from the group consisting of $(C_1$-$C_6)$alkyl, $(C_1$-$C_6)$perfluoroalkyl, $(C_6$-$C_{14})$aryl, $(C_6$-$C_{14})$perfluoroaryl; or wherein two or more of $R_2$, $R_3$, $R_4$ and $R_5$ taken together with the carbon atoms to which they are attached to form a substituted or unsubstituted, fused $(C_4$-$C_8)$carbocyclic ring, or a substituted or unsubstituted, fused aromatic ring.

It has been observed now that possessing in their structure a covalent metal-oxygen or metal-sulfur bond the compounds of the formula (I) are very stable and can be prepared without any protective atmosphere of inert gas, as well as in the solvents of analytical grade (pro analysi). Following their suitable activation, the complexes of the general formula (I) actively catalyze the metathesis reactions carried out in the presence of air. Moreover, the complexes of the general formula (I) actively catalyze the metathesis reactions only after being activated by chemical agents, and they are very hardly susceptible to thermal activation. These properties enable excellent control of the time of initiating the reaction; such a property is very useful especially for the ROMP-type reactions. It was unexpectedly observed that the complexes of the general formula (I) allowed obtaining polydicyclopentadiene via the ROMP-type reaction carried out in the air, the amount of the (pre)catalyst used being significantly lower than that in the case of using classical complexes. Even an amount of 100 ppm (parts per million, by weight) of the complex according to the invention, that contains an NHC ligand (an N-Heterocyclic Carbene ligand as described hereafter), effectively catalyzes polymerization of dicyclopentadiene (DCPD). This amount corresponds to the mole ratio of the monomer to the (pre)catalyst being of about 65,000:1. Thus, this amount of the (pre)catalyst is less than half of that in the case of the catalyst G (M. Perring, N. B. Bowden Langmuir, 2008, 24, 10480-10487). Also, the (pre)catalyst according to the invention containing two phosphine ligands is more active in the ROMP reaction of polydicyclopentadiene than the structurally similar complex G'. Besides, it was unexpectedly observed, that the effect of an electron-acceptor substituent on the rate of initiation of a (pre)catalyst was reversed in the case of complexes of the general formula (I) compared to the case of the classical complex of the Hoveyda-Grubbs type (K. Grela, S. Harutyunyan, A. Michrowska, Angew. Chem. Int. Ed. 2002, 41, No. 21).

The possibility of affecting the properties of a (pre) catalyst by changing its ligands and, in consequence, the possibility of optimal tuning its activity for a specific reaction, is extremely valuable. As a rule, a higher stability is observed for the catalysts containing an N-heterocyclic SIPr ligand in their structure, compared to the (pre)catalysts containing the SIMes ligand, although the differences in their effectiveness in the metathesis reactions are usually not very significant. Unexpectedly, it was found that the alteration of an N-heterocyclic carbene ligand (NHC) had a high effect on effectiveness of the complexes of the general formula (I) according to the invention. It was found that the catalyst containing the NHC ligand, SIPr, effectively catalyzed the reactions of ring-closing metathesis as well as the ene-yne type reaction, whereas it demonstrated lower activity both in the ROMP type reaction and CM (cross-metathesis) reaction. In turn, a catalyst of the general formula (I) containing the NHC ligand, SIMes, very effectively catalyzes the CM reactions as well as the ROMP type reactions, whereas it demonstrates lower effectiveness in the ring-closing metathesis reaction.

Accordingly, there is provided the compounds of the general formula (I) in accordance with the present invention as described hereinabove as precatalysts for the olefin metathesis reactions.

In some embodiments, the compound of the formula (I) according to this invention is having:

Y is oxygen;

$R_1$ is hydrogen;

$R_2$, $R_3$, $R_4$ and $R_5$ are the same or different and each independently selected from the group consisting of hydrogen, methyl, ethyl and —$NO_2$;

is of the formula (II):

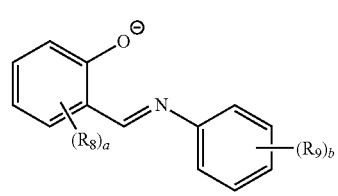

(II)

wherein:

a and b are integers from 0 to 5;

each $R_8$ and $R_9$ may be the same or different and independently of the other selected from the group consisting of hydrogen, halogen, $(C_1$-$C_{16})$alkyl, $(C_1$-$C_{16})$alkoxy, $(C_1$-$C_{16})$perfluoroalkyl, $(C_3$-$C_7)$cycloalkyl, $(C_2$-$C_{16})$alkenyl, $(C_6$-$C_{14})$aryl, $(C_6$-$C_{14})$perfluoroaryl, $(C_3$-$C_{12})$heterocyclyl, —$OR_6$, —$NO_2$, —COOH, —$COOR_6$, —$CONR_6R_7$, —$SO_2NR_6R_7$, —$SO_2R_6$, —CHO, —$COR_6$, wherein $R_6$ and $R_7$ are the same or different and each independently selected from the group consisting of $(C_1$-$C_6)$alkyl, $(C_1$-$C_6)$perfluoroalkyl, $(C_6$-$C_{14})$aryl, $(C_6$-$C_{14})$perfluoroaryl.

In some other embodiments, the compound of the formula (I) according to this invention is having:

Y is oxygen;

$R_1$ is hydrogen;

$R_2$, $R_3$, $R_4$ and $R_5$ are the same or different and each independently selected from the group consisting of hydrogen, methyl, ethyl and —$NO_2$;

$L_2$ is an N-heterocyclic carbene ligand of the formula (IIIA) or (IIIB):

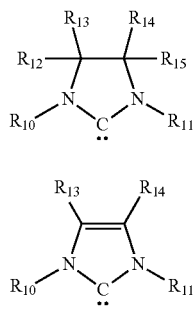

wherein:

$R_{10}$ and $R_{11}$ are the same or different and each independently selected from the group consisting of ($C_1$-$C_{12}$) alkyl, ($C_3$-$C_{12}$)cycloalkyl, ($C_2$-$C_{12}$alkenyl and substituted or unsubstituted ($C_6$-$C_{14}$)aryl;

$R_{12}$ $R_{13}$, $R_{14}$ and $R_{15}$ are the same or different and each independently selected from the group consisting of hydrogen, ($C_1$-$C_{12}$)alkyl, ($C_3$-$C_1$)cycloalkyl, ($C_2$-$C_{12}$) alkenyl, ($C_6$-$C_{14}$)aryl, optionally substituted with at least one of ($C_1$-$C_6$)alkyl, ($C_1$-$C_6$)perhaloalkyl, ($C_1$-$C_6$) alkoxy or halogen; or $R_{12}$, $R_{13}$, $R_{14}$, $R_{15}$ may optionally join together with the carbon atoms to which they are attached to form a substituted or unsubstituted, fused ($C_4$-$C_8$)carbocyclic ring, or a substituted or unsubstituted, fused aromatic ring.

In yet some other embodiments, the compound of the formula (I) according to this invention is having:

selected from the group consisting of:

a group of the formula (IIA):

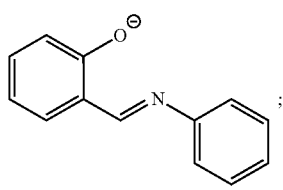 [SMILES: [O-]c1ccccc1/C=N/c1ccccc1]

a group of the formula (IIB):

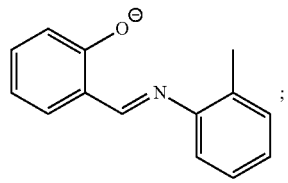 [SMILES: Cc1ccccc1/N=C/c1ccccc1[O-]]

a group of the formula (IIC):

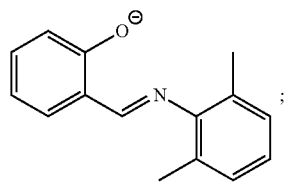 [SMILES: Cc1cccc(C)c1/N=C/c1ccccc1[O-]]

a group of the formula (IID):

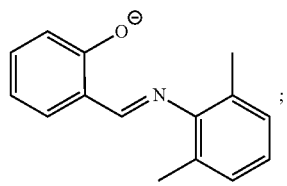

a group of the formula (IIE):

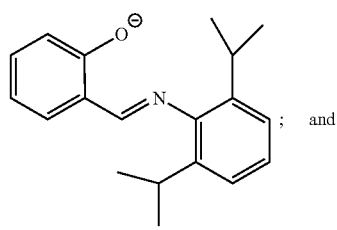 [SMILES: CC(C)c1cccc(C(C)C)c1/N=C/c1ccccc1[O-]]; and a group of the formula (IIF):

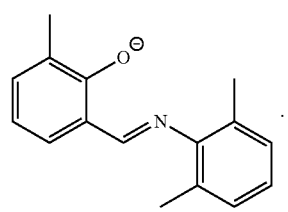 [SMILES: Cc1cccc(/C=N/c2c(C)cccc2C)c1[O-]]

Any of the known N-heterocyclic carbene compounds can be used as $L_2$ ligands. Non-liming examples of such N-heterocyclic compounds are selected from the group consisting of: pyridine, 4-(N,N-dimethylamino)pyridine, 3-bromopyridine, piperidine, morpholine, pyridazine, pyrimidine, pyrazine, piperazine, 1,2,3-triazole, 1,3,4-triazole, 1,2,3-triazine as well as 1,2,4-triazine. Accordingly, in some embodiments, the compound of the formula (I) according to this invention is having:

L₂ selected from the group consisting of:

(IIIC, SIMes)

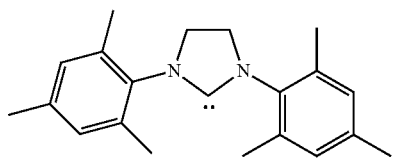

; and (IIID, SIPr)

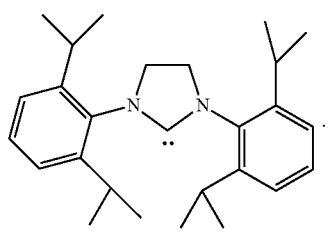

Representative non-limiting examples of the compound of the formula (I) may be enumerated as follows:

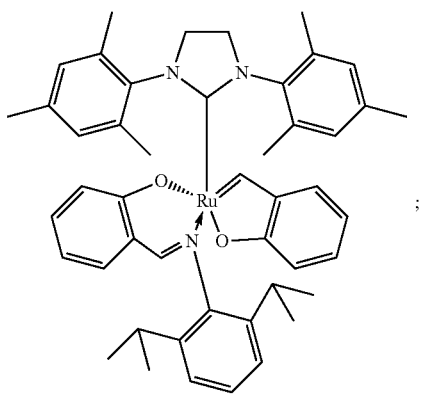

;

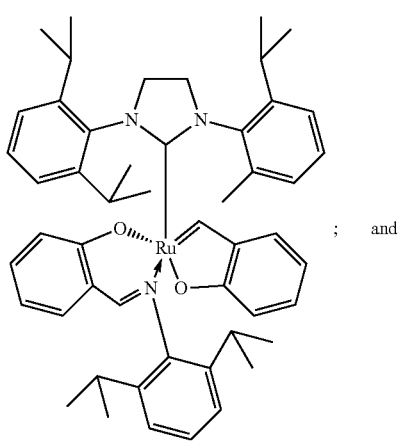

; and

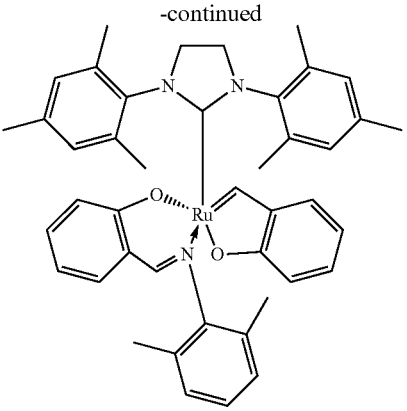

The invention is related also to use of the compounds of the general formula (I) as defined hereinabove as (pre)catalysts in the metathesis reactions. In some embodiments, the compounds of the general formula (I) are used as (pre)catalysts in the reactions of ring-closing metathesis, cross metathesis, homometathesis, alkene-alkyne type metathesis. In some other embodiments, the compounds of the general formula (I) are used as (pre)catalysts in the reaction of ring-opening metathetic polymerization.

The invention concerns also a process for carrying out the metathesis reaction of olefins, wherein at least one olefin is contacted with a compound of the general formula (I) as a (pre)catalyst.

Generally, the metathesis reaction is carried out in an organic solvent. Any of the organic solvents that would allow such polymerization reaction to be carried out can be used. Non-limiting examples of such organic solvents include dichloromethane, dichloroethane, toluene, ethyl acetate and mixtures in any combination thereof.

In some embodiments, the metathesis reaction is carried out without any solvent. In some other embodiments, the metathesis reaction is carried out in the presence of a chemical activator. In general, the chemical activator is a Bronsted or Lewis acid or a halo-derivative of alkane or silane. Non-limiting examples of such activators include hydrogen chloride, chlorotrimethylsilane or p-toluenesulfonic acid.

In some embodiments, the metathesis reaction is a ring-opening metathetic polymerization of dicyclopentadiene.

In yet some other embodiments, the (pre)catalyst of the general formula (I) is added in the solid form to dicyclopentadiene.

In one embodiment, the polymerization reaction is initiated by heating the mixture of dicyclopentadiene and the (pre)catalyst of the general formula (I) to a temperature of 30° C. or higher.

In some embodiments, the starting material contains at least 94 wt. % of dicyclopentadiene.

In another embodiment, the metathesis reaction is carried out at a temperature of from 20 to 120° C. In yet another embodiment, the metathesis reaction is carried out in a period of from 1 minute to 24 hours.

In some embodiments, the metathesis reaction is carried out in the presence of an additive promoting formation of cross bonds.

In one embodiment, the metathesis reaction is carried out using the amount of the (pre)catalyst equal to or less than 1000 ppm.

Throughout the description of the invention and patent claims, if ppm (parts per million) units are used with relation to amount of substance, these are on a weight basis.

Since the inventors do not wish to be bound by any particular mechanism of catalysis, the "(pre)catalyst" term is used to indicate that the compound according to the invention may be either the catalyst itself or a precursor of the active species being the actual catalyst.

The definitions of groups not defined below should have the broadest meanings known in the art.

The term "optionally substituted" means that one or more hydrogen atoms of the group in question have been replaced with the specified groups, provided that such a substitution results in formation of a stable compound.

The term "halo" or "halogen" represents an element selected from F, Cl, Br, I.

The term "alkyl" concerns a saturated, straight-chain or branched-chain hydrocarbon substituent having the specified number of carbon atoms. The non-limiting examples of alkyls are: methyl, ethyl, propyl, isopropyl, butyl, sec-butyl, tert-butyl, pentyl.

The term "alkoxy" concerns the alkyl substituent, as defined above, bound via an oxygen atom.

The term "perfluoroalkyl" represents the alkyl, as defined above, wherein all hydrogens have been replaced with halogen atoms, where the halogen atoms may be identical or different.

The term "cycloalkyl" concerns a saturated mono- or polycyclic hydrocarbon substituent having the specified number of carbon atoms. The non-limiting examples of a cycloalkyl substituent are cyclopropyl, cyclobutyl, cyclopentyl, cyclohexyl.

The term "alkenyl" concerns a non-cyclic, straight or branched hydrocarbon chain having the specified number of carbon atoms and containing at least one carbon-carbon double bond. The non-limiting examples of alkenyls are: vinyl, allyl, 1-butenyl, 2-butenyl.

The term "aryl" concerns an aromatic mono- or polycyclic hydrocarbon substituent having the specified number of carbon atoms. The non-limiting examples of aryl are: phenyl, mesityl, anthracenyl.

The term "heterocyclyl" concerns aromatic as well as non-aromatic cyclic substituents having the specified number of carbon atoms, wherein one or more carbon atoms have been replaced with a heteroatom such as nitrogen, phosphorus, sulfur, oxygen, provided that there are no two directly connected oxygen or sulphur atoms in the ring. Non-aromatic heterocyclyls can contain from 4 to 10 atoms in the ring, whereas aromatic heterocyclyls must have at least 5 atoms in the ring. The benzo-fused systems also belong to heterocyclyls. The non-limiting examples of non-aromatic heterocyclyls are: pyrrolidinyl, tetrahydrofuranyl, dihydrofuranyl, tetrahydrothienyl, tetrahydropyranyl, dihydropyranyl, tetrahydrothiopyranyl, piperidinyl, morpholinyl, thiomorpholinyl, 2-pyrrolinyl, indolinyl. The non-limiting examples of aromatic heterocyclyls are: pyridinyl, imidazolyl, pyrimidinyl, pyrazolyl, triazolyl, pyrazinyl, furyl, thienyl. The above-mentioned groups may be bound via a carbon atom or a nitrogen atom. For example, the substituent obtained by binding pyrrole may be either pyrrol-1-yl (N-bound) or pyrrol-3-yl (C-bound).

The term "neutral ligand" concerns a substituent having no electrical charge, capable of co-ordinating to a ruthenium atom. The non-limiting examples of such ligands are: N-heterocyclic carbene ligands, amines, imines, phosphines and oxides thereof, alkyl and aryl phosphites and phosphates, ethers, alkyl and aryl sulfides, co-ordinated hydrocarbons, haloalkanes and haloarenes. The term "neutral ligand" encompasses also N-heterocyclic compounds; their non-limiting examples are: pyridine, 4-(N,N-dimethylamino)pyridine (DMAP), 3-bromopyridine, piperidine, morpholine, pyridazine, pyrimidine, pyrazine, piperazine, 1,2,3-triazole, 1,3,4-triazole, 1,2,3-triazine and 1,2,4-triazine.

The term "anionic ligand" concerns the substituent capable to co-ordination with a metal center, bearing an electrical charge capable to compensate the charge of the metal center, wherein such a compensation may be complete or partial. The non-limiting examples of anionic ligands are: fluoride, chloride, bromide or iodide anions, carboxylic acid anions, alcohol and phenol anions, thiol and thiophenol anions, (organo)sulfuric and (organo)phosphoric acid anions as well as anions of esters thereof.

The term "bidentate anionic ligand $(X-L_1)$" means that the neutral ligands $L_1$ is bound together with anionic ligand, X, resulting in the formation of bidentate ligands. Similarly, various bidentate ligands are also possible with the combination of X and $L_1$. The non-limiting examples of multidentate ligands are: a bidentate ligand $(X_1-L_1)$, a tridentate ligand $(X_1-L_1-L_2)$. The non-limiting examples of such ligands are: anion of 2-hydroxyacetophenone, anion of acetylacetone and aryliminoaryloxy group as described hereinabove.

The term "carbene" concerns a molecule containing a neutral carbon atom having the valence number of 2 and two non-paired valence electrons. The term "carbene" encompasses also carbene analogues, wherein the carbon atom is replaced with another chemical element such as: boron, silicon, nitrogen, phosphorus, sulfur. The term "carbene" relates particularly to N-heterocyclic carbene (NHC) ligands. The non-limiting examples of the NHC ligands are:

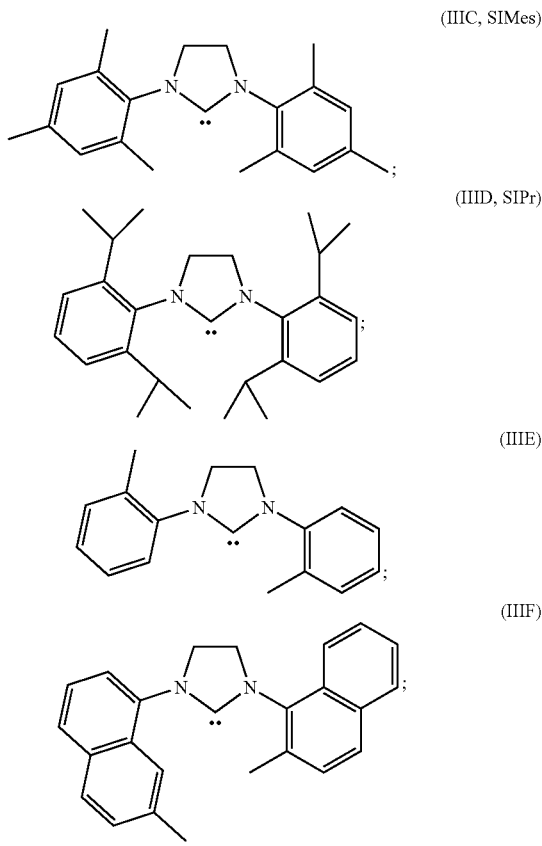

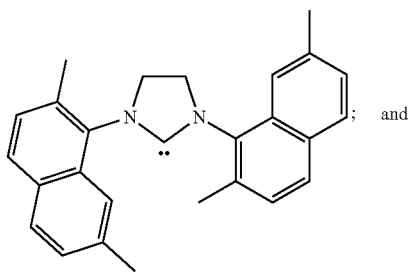

(IIIG)

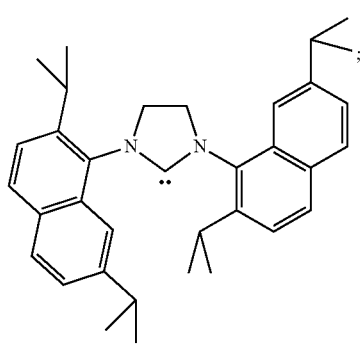

(IIIH)

The non-limiting examples of preferred agents promoting formation of cross bonds are tert-butyl peroxide, di-tert-butyl peroxide, and also mixtures thereof.

The following examples describe the procedures used for the preparation of the compounds of this invention and their use in olefin metathesis. The following examples are only intended to illustrate the invention and to explain its particular aspects. The activity of the catalyst 1c according to the invention was compared to the LatMet-PCy$_3$, its structure is presented below:

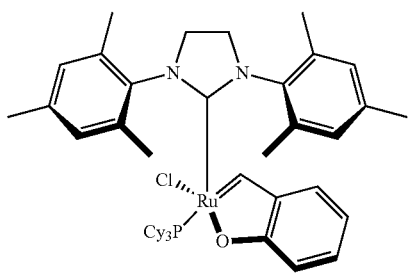

LatMet-PCy$_3$

DCPD contains 6% m/m tricyclopentadiene (TCPD), tricyclohexylphosphine, solution of lithium bis(trimethylsilyl)amide, solution of potassium tert-pentoxide, hydrogen chloride solution in THF are commercially available. Compounds 1-7 were prepared according to literature procedures. All reactions were carried out under argon. The toluene was washed with citric acid, water, dried with 4 Å molecular sieves and deoxidized with argon. The THF was dried with 4 Å molecular sieves and deoxidized with argon.

EXAMPLE 1

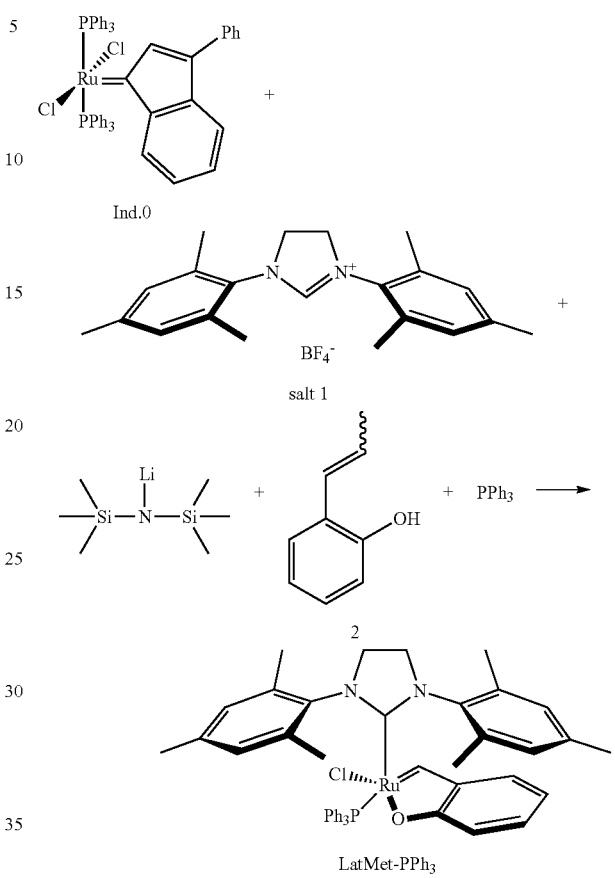

LatMet-PPh$_3$

Solution of lithium bis(trimethylsilyl)amide in toluene (1 M, 12.4 mL, 1.1 eq) was added to the suspension of salt 1 (5.11 g, 1.15 eq) in toluene (82 mL). Resulted mixture was stirred at room temperature for 30 min and then placed in oil bath at temperature of 80° C. After 10 min Ind.0 (10.0 g, 11.3 mmol, 1 eq, $C_{Ind.0}$ 0.12 M) was added and the mixture was stirred for 10 min. Next 2 (2.27 g, 1.5 eq) was added and after additional 30 min triphenylphosphine was added (1.48 g, 0.5 eq). Reaction mixture was stirred at 80° C. for 90 min, then cooled down to room temperature and filtered through a short pad of silica gel (eluent: toluene). Crude product was purified by crystallization and recrystallization from dichloromethane/n-heptane mixture, green solid, 4.2 g, 46% yield.

EXAMPLE 2

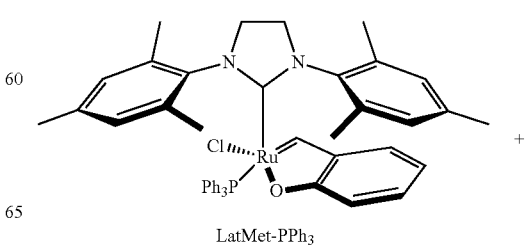

LatMet-PPh$_3$

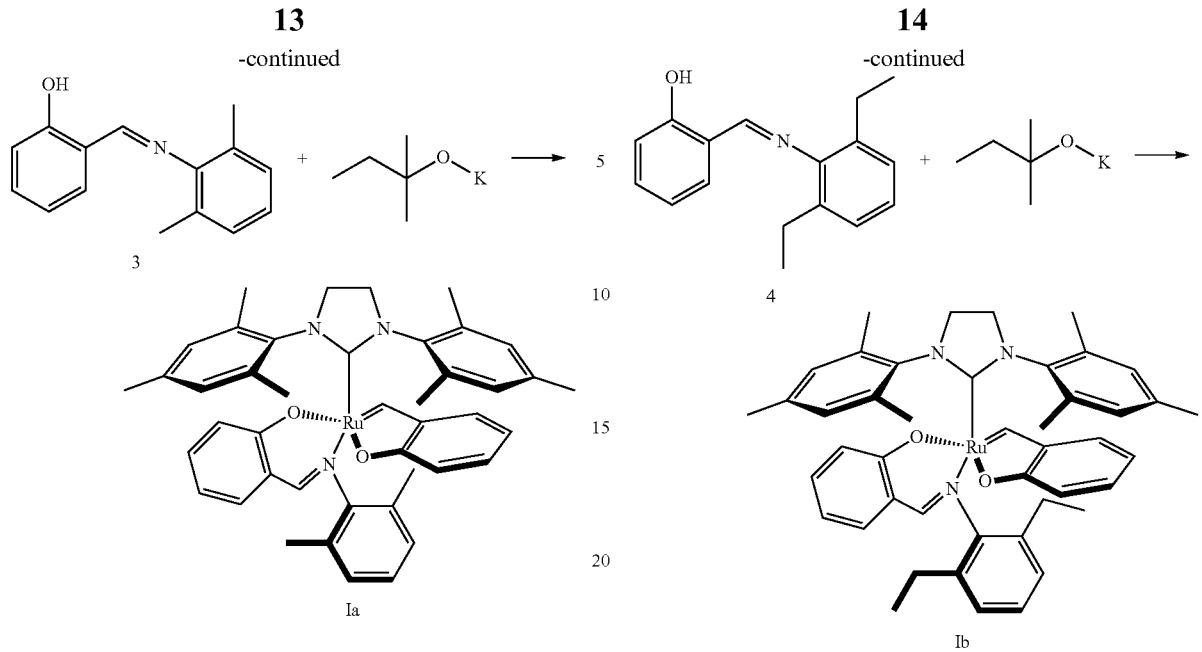

Solution of potassium tert-pentoxide in toluene (1.7 M, 2.09 mL, 1.22 eq) was added to the solution of imine 3 (0.80 g, 1.22 eq) in tetrahydrofuran (27 mL) and the resulted mixture was stirred at 40° C. for 20 min. Next LatMet-PPh$_3$ (2.36 g, 2.91 mmol, 1 eq) was added and reaction was continued for 20 min. Solvents were evaporated to dryness, the residue was dissolved in cyclohexane:ethyl acetate 95:5 mixture (Eluent 1) and filtered through a short pad of silica gel (Eluent 1→cycylohexane:ethyl acetate 9:1 [Eluent 2]). Crude product was crystallized from dichloromethane/methanol mixture, brown crystals, 1.81 g, 84%.

$^1$H NMR (600 MHz, CD$_2$Cl$_2$) δ ppm: 15.19 (s, 1H), 7.41 (s, 1H), 7.21 (ddd, J=8.7, 6.8, 1.9 Hz, 1H), 7.21 (ddd, J=8.7, 6.8, 1.9 Hz, 1H), 7.09 (bs, 1H), 7.04 (d, J=8.8 Hz, 2H), 6.91 (dd, J=7.8, 1.9 Hz, 1H), 6.88 (d, J=7.5 Hz, 2H), 6.72-6.68 (m, 2H), 6.43-6.41 (m, 2H), 6.33 (dd, J=7.4, 1.5 Hz, 1H), 6.25 (dd, J=7.6, 1.7 Hz, 1H), 6.10 (ddd, J=7.5, 6.6, 1.0 Hz, 1H), 5.94 (d, J=8.5 Hz, 1H), 4.11-4.04 (m, 1H), 3.92-3.75 (m, 3H), 2.68 (s, 3H), 2.48 (s, 3H), 2.38 (s, 3H), 2.31 (s, 6H), 1.70 (s, 3H), 1.12 (s, 2H), 0.90 (s, 3H).

$^{13}$C NMR (150 MHz, CD$_2$Cl$_2$) δ ppm: 287.7, 222.2, 181.3, 169.8, 164.0, 149.9, 148.4, 139.9, 139.7, 139.1, 138.1, 137.3, 136.1, 134.7, 132.9, 132.0, 130.8, 130.4, 129.9, 129.8, 129.7, 129.2, 127.5, 126.9, 124.8, 124.1, 122.3, 119.4, 116.2, 113.3, 111.2, 51.7, 51.1, 21.4, 18.9, 18.5, 18.2, 17.5, 16.5.

Solution of potassium tert-pentoxide in toluene (1.7 M, 1.51 mL, 1.15 eq) was added to the solution of imine 4 (0.65 g, 1.15 eq) in tetrahydrofuran (22 mL) and the resulted mixture was stirred at 40° C. for 20 min. Next LatMet-PPh$_3$ (1.81 g, 2.23 mmol, 1 eq) was added and reaction was continued for 20 min. Solvents were evaporated to dryness, the residue was dissolved in cyclohexane:ethyl acetate 95:5 mixture (Eluent 1) and filtered through a short pad of silica gel (Eluent 1→cycylohexane:ethyl acetate 9:1 [Eluent 2]). Crude product was crystallized from dichloromethane/methanol mixture, brown crystals, 1.36 g, 80%.

$^1$H NMR (600 MHz, CD$_2$Cl$_2$) δ ppm: 15.16 (s, 1H), 7.46 (s, 1H), 7.21 (ddd, J=8.8, 6.8, 1.9 Hz, 1H), 7.12 (bs, 1H), 7.05-7.03 (m, 2H), 6.93-6.88 (m, 3H), 6.80 (t, J=7.6 Hz, 1H), 6.68 (ddd, J=8.4, 6.7, 1.7 Hz, 1H), 6.43-6.37 (m, 3H), 6.22 (dd, J=7.7, 1.7 Hz, 1H), 6.08 (ddd, J=7.4, 6.6, 0.9 Hz, 1H), 5.89 (d, J=8.4 Hz, 1H), 4.12-3.99 (m, 1H), 3.89-3.73 (m, 3H), 2.67 (s, 3H), 2.51 (s, 3H), 2.40 (s, 3H), 2.32 (d, J=24.8 Hz, 6H), 2.27-2.14 (m, 3H), 1.20-1.13 (m, 3H), 1.02 (dq, J=15.2, 7.6 Hz, 1H), 0.86 (t, J=7.5 Hz, 3H), 0.49 (t, J=7.6 Hz, 3H).

$^{13}$C NM R (150M Hz, CD2Cl2) δ ppm: 287.7, 222.5, 181.2, 169.9, 164.2, 148.4, 148.3, 140.1, 139.9, 138.9, 138.1, 137.7, 137.3, 136.1, 136.0, 134.8, 132.9, 130.7, 130.4, 129.8, 129.7, 129.2, 125.2, 125.2, 124.1, 122.5, 119.0, 116.2, 113.3, 113.3, 111.1, 51.7, 51.1, 26.1, 23.6, 21.5, 21.4, 18.5, 18.2, 16.5, 15.8, 14.8.

EXAMPLE 3

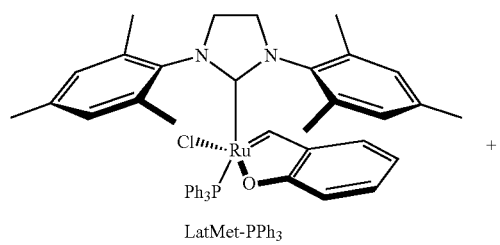

LatMet-PPh$_3$

+

EXAMPLE 4

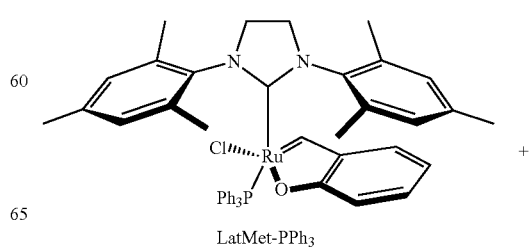

LatMet-PPh$_3$

+

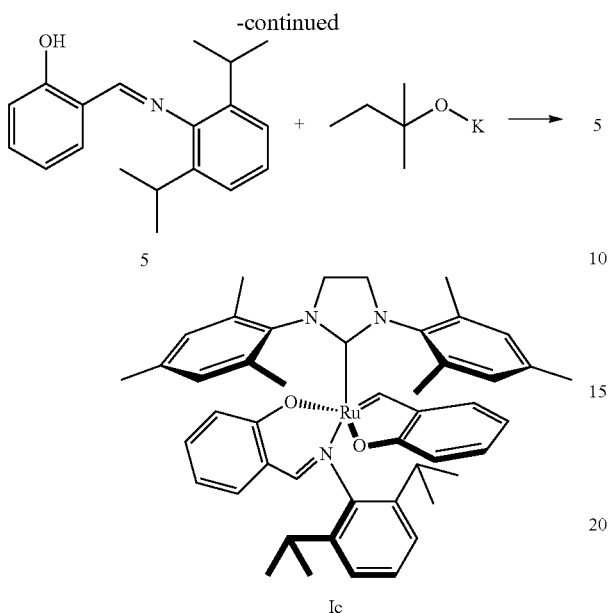

Ic

Solution of potassium tert-pentoxide in toluene (1.7 M, 0.89 mL, 1.22 eq) was added to the solution of imine 5 (0.42 g, 1.22 eq) in tetrahydrofuran (12 mL) and the resulted mixture was stirred at 40° C. for 20 min. Next LatMet-PPh$_3$ (1.0 g, 1.23 mmol, 1 eq) was added and reaction was continued for 20 min. Solvents were evaporated to dryness, the residue was dissolved in cyclohexane:ethyl acetate 95:5 mixture (Eluent 1) and filtered through a short pad of silica gel (Eluent 1→cycylohexane:ethyl acetate 9:1 [Eluent 2]). Crude product was crystallized from dichloromethane/methanol mixture, brown crystals, 0.64 g, 65%.

$^1$H NMR (600 MHz, CD$_2$Cl$_2$) δ ppm: 15.40 (s, 1H), 7.45 (s, 1H), 7.19 (ddd, J=8.7, 6.8, 1.9 Hz, 1H), 7.15 (bs., 1H), 7.06 (bs., 1H), 6.99 (dd, J=7.9, 1.5 Hz, 1H), 6.96 (d, J=8.7 Hz, 1H), 6.87 (dd, J=7.8, 1.9 Hz, 1H), 6.82-6.79 (m, 1H), 6.76-6.68 (m, 1H), 6.66 (ddd, J=8.3, 6.6, 1.6 Hz, 1H), 6.46-6.36 (m, 3H), 6.19 (dd, J=7.7, 1.7 Hz, 1H), 6.04-5.96 (m, 2H), 4.14-3.93 (m, 1H), 3.88-3.79 (m, 2H), 3.75 (bs, 1H), 3.06 (sept, J=6.8 Hz, 1H), 2.67 (s, 2H), 2.44 (s, 6H), 2.30 (s, 7H), 1.51 (d, J=6.6 Hz, 3H), 1.42 (sept, J=6.9 Hz, 1H), 1.13 (s., 3H), 0.82 (d, J=6.8 Hz, 3H), 0.52 (d, J=6.8 Hz, 3H), 0.44 (d, J=6.7 Hz, 3H)

$^{13}$C NMR (150 MHz, CD$_2$Cl$_2$) δ ppm: 287.2, 221.8, 181.3, 169.8, 165.0, 164.9, 148.0, 146.4, 142.3, 141.3, 139.8, 138.7, 138.1, 136.2, 132.9, 130.4, 130.2, 130.0, 129.6, 129.2, 125.5, 124.6, 123.5, 122.6, 122.0, 119.0, 115.8, 113.2, 110.6, 51.9, 50.7, 29.6, 26.9, 26.3, 25.5, 23.2, 22.7, 21.4, 18.5, 18.3, 16.5.

EXAMPLE 5

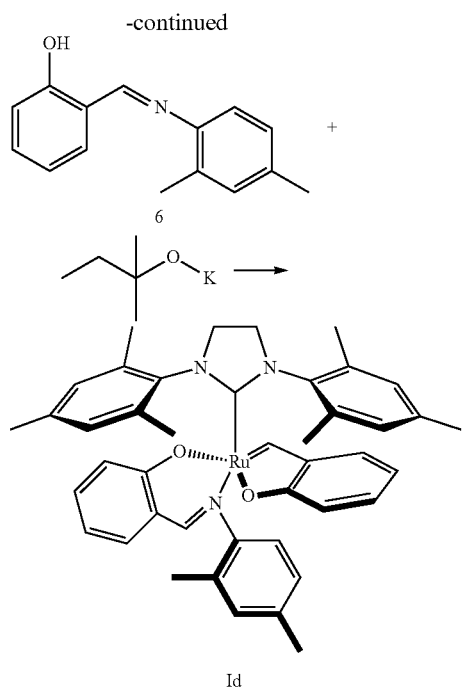

Id

Solution of potassium tert-pentoxide in toluene (1.7 M, 1.33 mL, 1.22 eq) was added to the solution of imine 6 (0.51 g, 1.22 eq) in tetrahydrofuran (18 mL) and the resulted mixture was stirred at 40° C. for 20 min. Next LatMet-PPh$_3$ (1.5 g, 1.85 mmol, 1 eq) was added and reaction was continued for 20 min. Solvents were evaporated to dryness, the residue was dissolved in cyclohexane:ethyl acetate 95:5 mixture (Eluent 1) and filtered through a short pad of silica gel (Eluent 1→cycylohexane:ethyl acetate 9:1 [Eluent 2]). Crude product was crystallized from dichloromethane/methanol mixture, brown crystals, 1.11 g, 60%.

$^1$H NMR (600 MHz, CD$_6$) δ ppm: 15.35 (s, 1H), 7.37 (d, J=8.7 Hz, 2H), 7.29-2.27 (m, 1H), 7.01 (ddd, J=8.3, 6.7, 1.7 Hz, 1H), 6.83 (s, 1H), 6.68 (d, J=7.8 Hz, 2H), 6.62 (s, 1H), 6.59 (bs, 1H), 6.53 (s, 1H), 6.44-6.42 (m, 3H), 6.40-6.39 (m, 2H), 6.32 (bs, 1H), 5.50 (s, 1H), 4.28 (s, 1H), 3.42-3.31 (m, 2H), 3.28-3.19 (m, 2H), 3.18-3.11 (m, 2H), 3.11-3.01 (m, 2H), 2.69 (s, 6H), 2.53-2.49 (m, 3H), 2.17-2.08 (m, 3H), 1.99-1.88 (m, 2H), 1.33 (s, 3H), 1.08 (s, 1H).

$^{13}$C NMR (150 MHz, C$_5$D$_6$) δ ppm: 223.1, 137.6, 137.5, 136.3, 134.3, 132.9, 130.6, 130.3, 129.7, 129.6, 129.2, 123.9, 113.4, 111.3, 53.4, 51.1, 21.2, 21.0, 18.8, 18.3, 18.1, 16.6.

EXAMPLE 6

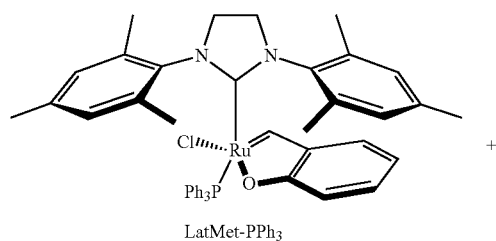

LatMet-PPh$_3$

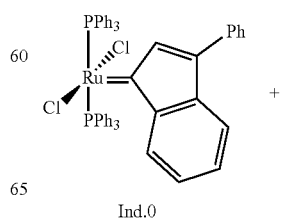

Ind.0

-continued

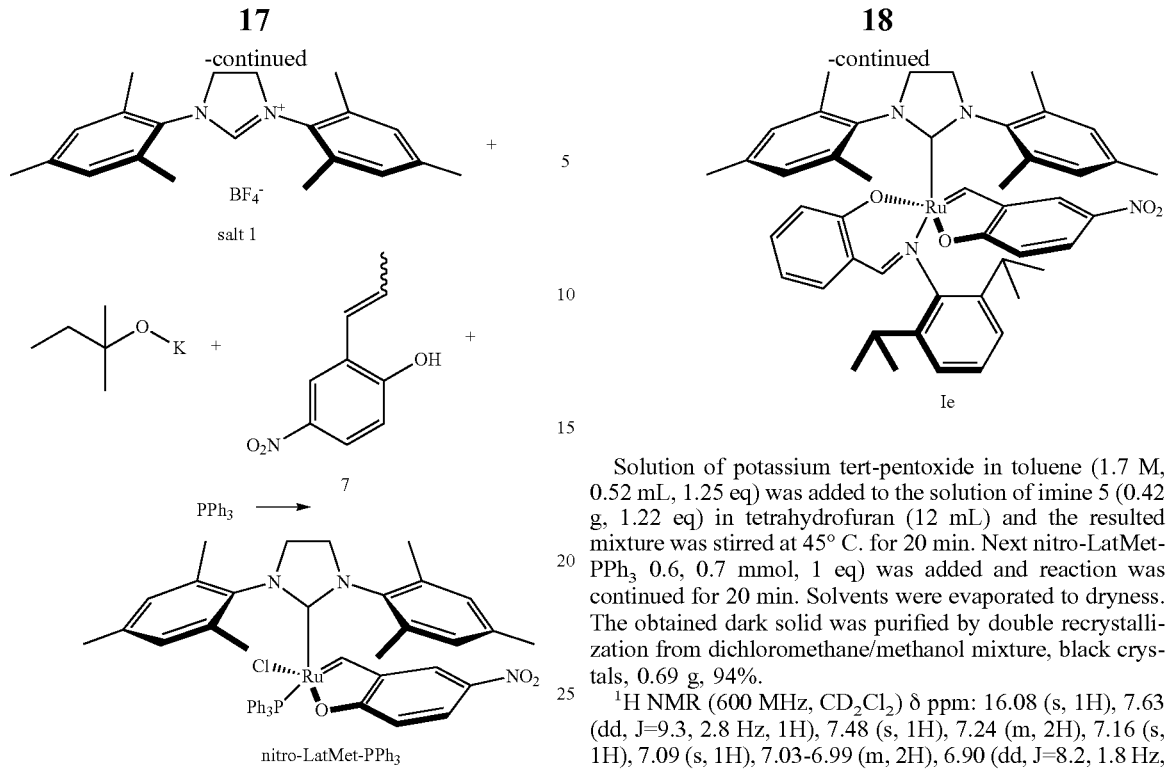

Solution of potassium tert-pentoxide in toluene (1.7 M, 6.74 mL, 1.1 eq) was added to the suspension of salt 1 (4.72 g) in toluene (80 mL). Resulted mixture was stirred at room temperature for 30 min and then placed in oil bath at temperature of 80° C. After 10 min Ind.0 (9.24 g, 10.4 mmol, 1 eq, $C_{Ind.0}$ 0.12 M) was added and the mixture was stirred for 10 min. Next 7 (2.8 g, 1.5 eq) and triphenylphosphine (2.73 g, 1.0 eq) were added. Reaction mixture was stirred at 80° C. for 90 min, then cooled down to room temperature and filtered through a short pad of silica gel (eluent: toluene). Crude product was purified by crystallization and double recrystallization from dichloromethane/methanol mixture, dark green solid, 3.5 g, 39% yield.

EXAMPLE 7

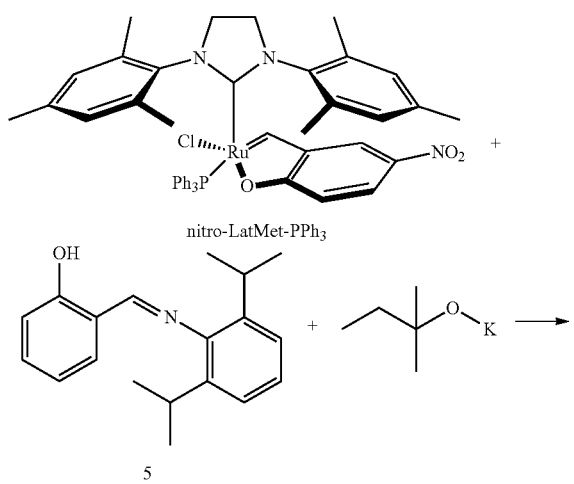

Solution of potassium tert-pentoxide in toluene (1.7 M, 0.52 mL, 1.25 eq) was added to the solution of imine 5 (0.42 g, 1.22 eq) in tetrahydrofuran (12 mL) and the resulted mixture was stirred at 45° C. for 20 min. Next nitro-LatMet-PPh₃ 0.6, 0.7 mmol, 1 eq) was added and reaction was continued for 20 min. Solvents were evaporated to dryness. The obtained dark solid was purified by double recrystallization from dichloromethane/methanol mixture, black crystals, 0.69 g, 94%.

$^1$H NMR (600 MHz, CD$_2$Cl$_2$) δ ppm: 16.08 (s, 1H), 7.63 (dd, J=9.3, 2.8 Hz, 1H), 7.48 (s, 1H), 7.24 (m, 2H), 7.16 (s, 1H), 7.09 (s, 1H), 7.03-6.99 (m, 2H), 6.90 (dd, J=8.2, 1.8 Hz, 1H), 6.87-6.83 (m, 1H), 6.68 (s, 1H), 6.48-6.44 (m, 2H), 6.32 (s, 1H), 5.97 (d, J=9.3 Hz, 1H), 4.18-4.05 (m, 1H), 3.92-3.80 (m, 3H), 3.04 (sept, J=6.8 Hz, 1H), 2.62 (s, 3H), 2.43 (s, 6H), 2.23 (s, 6H), 1.51 (d, J=6.7, 3H), 1.33 (dt, J=13.5, 6.7 Hz, 1H), 1.26 (s, 3H), 0.87 (d, J=6.8 Hz, 3H), 0.53 (d, J=6.9 Hz, 3H), 0.43 (d, J=6.8 Hz, 3H).

$^{13}$C NMR (151 MHz, CD$_2$Cl$_2$) δ ppm: 289.8, 219.9, 185.5, 169.8, 165.8, 145.8, 145.8, 142.12, 142.1, 141.2, 139.8, 139.4, 139.2, 137.9, 137.4, 136.7, 136.4, 133.8, 133.5, 130.2, 129.9, 129.6, 126.2, 125.9, 124.5, 123.1, 122.3, 118.5, 118.3, 114.8, 113.9, 51.8, 50.9, 29.7, 26.8, 26.3, 25.6, 23.1, 22.7, 21.4, 21.4, 18.8, 18.5, 18.1, 16.8.

EXAMPLE 8

Two formulations were prepared. Formulation A: 5 mL of DCPD (6% m/m TCPD), LatMet-PCy₃ (1.228 mg, 40 ppm in 50 μL of dry toluene). Formulation B: 5 mL of DCPD (6% m/m TCPD), hydrogen chloride solution in THF (0.75 M, 40 μL, 800 ppm). Formulation B was added to Formulation A, results:

| Time [min] | observations |
| --- | --- |
| 0 | Formulations A and B were mixed |
| 2:20 | End of gelation, gel point |
| 3:00 | Change in refractive index, discoloration, 205° C. |
| 3:05 | Smokes |
| 3:15 | $T_{max}$ = 210° C. |

EXAMPLE 9

Two formulations were prepared. Formulation A: 5 mL of DCPD (6% m/m TCPD), 1c (1.176 mg, 40 ppm in 50 μL of dry toluene). Formulation B: 5 mL of DCPD (6% m/m TCPD), hydrogen chloride solution in THF (0.75 M, 60 μL, 1200 ppm). Formulation B was added to Formulation A, results:

| Time [min] | observations |
|---|---|
| 0 | Formulations A and B were mixed |
| 0:12 | End of gelation, gel point |
| 0:20 | Change in refractive index, discoloration, 207° C., smokes |
| 0:25 | $T_{max} = 210°$ C. |

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

The invention claimed is:

1. A compound of the formula (1):

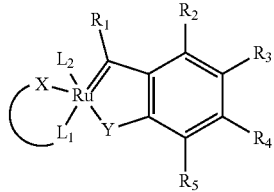

wherein:

is a monovalent anionic bidentate ligand;

Y is oxygen or sulfur;

$L_2$ is a neutral ligand;

$R_1$ is selected from the group consisting of hydrogen, $(C_1-C_{20})$alkyl, $(C_2-C_{20})$alkenyl, $(C_2-C_{20})$alkynyl and $(C_6-C_{10})$aryl;

$R_2$, $R_3$, $R_4$ and $R_5$ are the same or different and each independently selected from the group consisting of hydrogen, halogen, $(C_1-C_{16})$alkyl, $(C_1-C_{16})$alkoxy, $(C_1-C_{16})$perhaloalkyl, $(C_3-C_7)$cycloalkyl, $(C_2-C_{16})$alkenyl, $(C_6-C_{14})$aryl, $(C_6-C_{14})$perhaloaryl, $(C_3-C_{12})$heterocyclyl, $-OR_6$, $-NO_2$, $-COOH$, $-COOR_6$, $-CONR_6R_7$, $-SO_2NR_6R_7$, $-SO_2R_6$, $-CHO$, $-COR_6$, wherein $R_6$ and $R_7$ are the same or different and each independently selected from the group consisting of $(C_1-C_6)$alkyl, $(C_1-C_6)$perhaloalkyl, $(C_6-C_{14})$aryl, $(C_6-C_{14})$perhaloaryl; or wherein two or more of $R_2$, $R_3$, $R_4$ and $R_5$ taken together with the carbon atoms to which they are attached to form a substituted or unsubstituted, fused $(C_4-C_8)$carbocyclic ring, or a substituted or unsubstituted, fused aromatic ring.

2. The compound according to claim 1, wherein:

Y is oxygen;

$R_1$ is hydrogen;

$R_2$, $R_3$, $R_4$ and $R_5$ are the same or different and each independently selected from the group consisting of hydrogen, methyl, ethyl and $-NO_2$;

is of the formula 2:

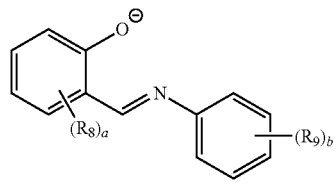

wherein:

a and b are integers from 0 to 5;

each $R_8$ and $R_9$ may be the same or different and independently of the other selected from the group consisting of hydrogen, halogen, $(C_1-C_{16})$alkyl, $(C_1-C_{16})$alkoxy, $(C_1-C_{16})$perhaloalkyl, $(C_3-C_7)$cycloalkyl, $(C_2-C_{16})$alkenyl, $(C_6-C_{14})$aryl, $(C_6-C_{14})$perhaloaryl, $(C_6-C_{12})$heterocyclyl, $-OR_s$, $-NO_2$, $-COOH$, $-COOR_6$, $-CONR_6R_7$, $-SO_2NR_6R_7$, $-SO_2R_6$, $-CHO$, $-COR_6$, wherein $R_6$ and $R_7$ are the same or different and each independently selected from the group consisting of $(C_1-C_6)$alkyl, $(C_1-C_6)$perhaloalkyl, $(C_6-C_{14})$aryl, $(C_6-C_{14})$perhaloaryl.

3. The compound according to claim 1, wherein:

Y is oxygen;

$R_1$ is hydrogen;

$R_2$, $R_3$, $R_4$ and $R_5$ are the same or different and each independently selected from the group consisting of hydrogen, methyl, ethyl and $-NO_2$;

$L_2$ is a ligand of the formula 3a or 3b:

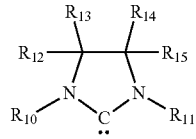

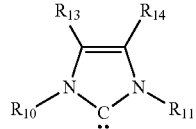

wherein:

$R_{10}$ and $R_{11}$ are the same or different and each independently selected from the group consisting of $(C_1-C_{12})$alkyl, $(C_3-C_{12})$cycloalkyl, $(C_2-C_{12})$alkenyl and substituted or unsubstituted $(C_6-C_{14})$aryl;

$R_{12}$ $R_{13}$, $R_{14}$ and $R_{15}$ are the same or different and each independently selected from the group consisting of hydrogen, $(C_1-C_{12})$alkyl, $(C_3-C_{12})$cycloalkyl, $(C_2-C_{12})$alkenyl, $(C_6-C_{14})$aryl, optionally substituted with at least one of $(C_1-C_6)$alkyl, $(C_1-C_6)$perhaloalkyl, $(C_1-C_6)$alkoxy or halogen; or $R_{12}$, $R_{13}$, $R_{14}$, $R_{15}$ may optionally join together with the carbon atoms to which they are attached to form a substituted or unsubstituted, fused $(C_4-C_8)$carbocyclic ring, or a substituted or unsubstituted, fused aromatic ring.

4. The compound according to claim 1, wherein:

is selected from the group consisting of:
a group of the formula 2a:

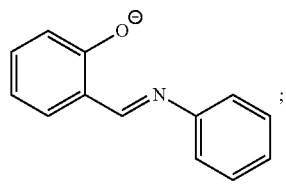

a group of the formula 2b:

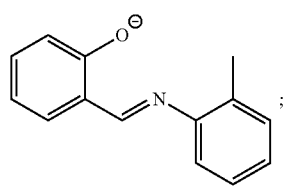

a group of the formula 2c:

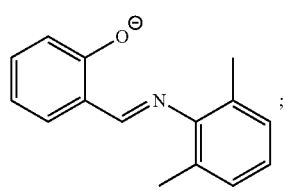

a group of the formula 2e:

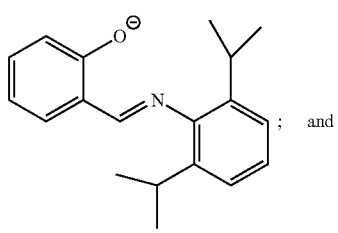

a group of the formula 2f:

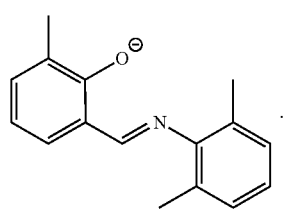

5. The compound according to claim 1, wherein:
$L_2$ is selected from the group consisting of:

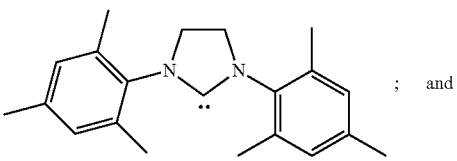

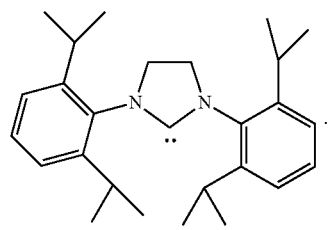

6. The compound according to claim 1, which is selected from the group consisting of:

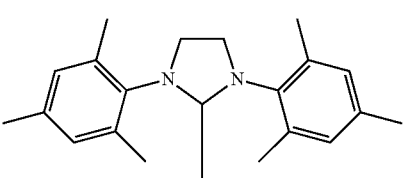

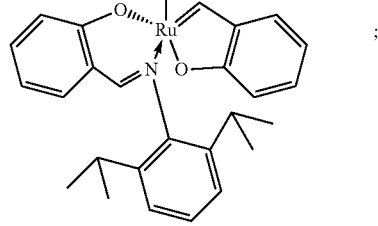

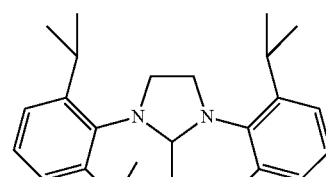

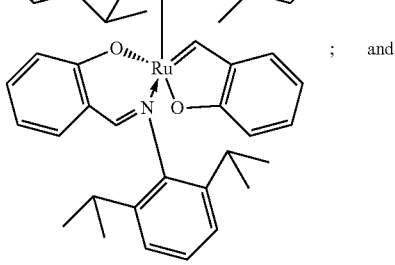

-continued

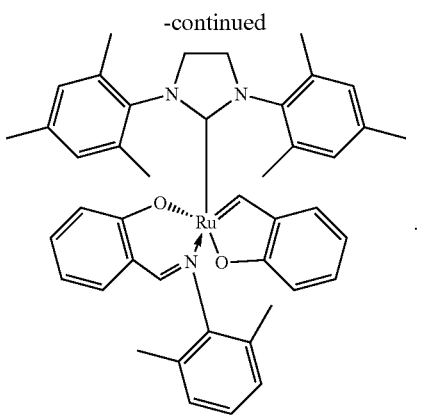

7. A process for carrying out a metathesis reaction of olefins, comprising contacting at least one olefin with the compound of claim 1 as a (pre)catalyst.

8. The process according to claim 7, wherein the metathesis reaction is carried out in an organic solvent.

9. The process according to claim 8, wherein the organic solvent is selected from the group consisting of dichloromethane, dichloroethane, toluene, ethyl acetate and a mixture in any combination thereof.

10. The process according to claim 7, wherein the metathesis reaction is carried out without any solvent.

11. The process according to claim 7, wherein the metathesis reaction is carried out in the presence of a chemical activator.

12. The process according to claim 11, wherein the chemical activator is selected from the group consisting of a Bronsted acid, a Lewis acid, a halo-derivative of alkane and a halo-derivative of silane.

13. The process according to claim 11, wherein the chemical activator is selected from the group consisting of hydrogen chloride, chlorotrimethylsilane and p-toluenesulfonic acid.

14. The process according to claim 7, wherein the metathesis reaction is a ring-opening metathetic polymerization of dicyclopentadiene.

15. The process according to claim 14, wherein the (pre)catalyst of the formula (1) is added in the solid form to dicyclopentadiene.

16. The process according to claim 14, wherein the polymerization reaction is initiated by heating a mixture of dicyclopentadiene and the (pre)catalyst of the formula (1) to a temperature of 30° C. or higher.

17. The process according to claim 7, wherein the metathesis reaction is carried out at a temperature of from 20 to 120° C.

18. The process according to claim 7, wherein the metathesis reaction is carried out in a period of from 1 minute to 24 hours.

19. The process according to claim 7, wherein the metathesis reaction is carried out in the presence of an additive promoting formation of cross bonds.

20. The process according to claim 7, wherein the metathesis reaction is carried out using the amount of the (pre)catalyst equal to or less than 1000 ppm.

* * * * *